Figure 1:
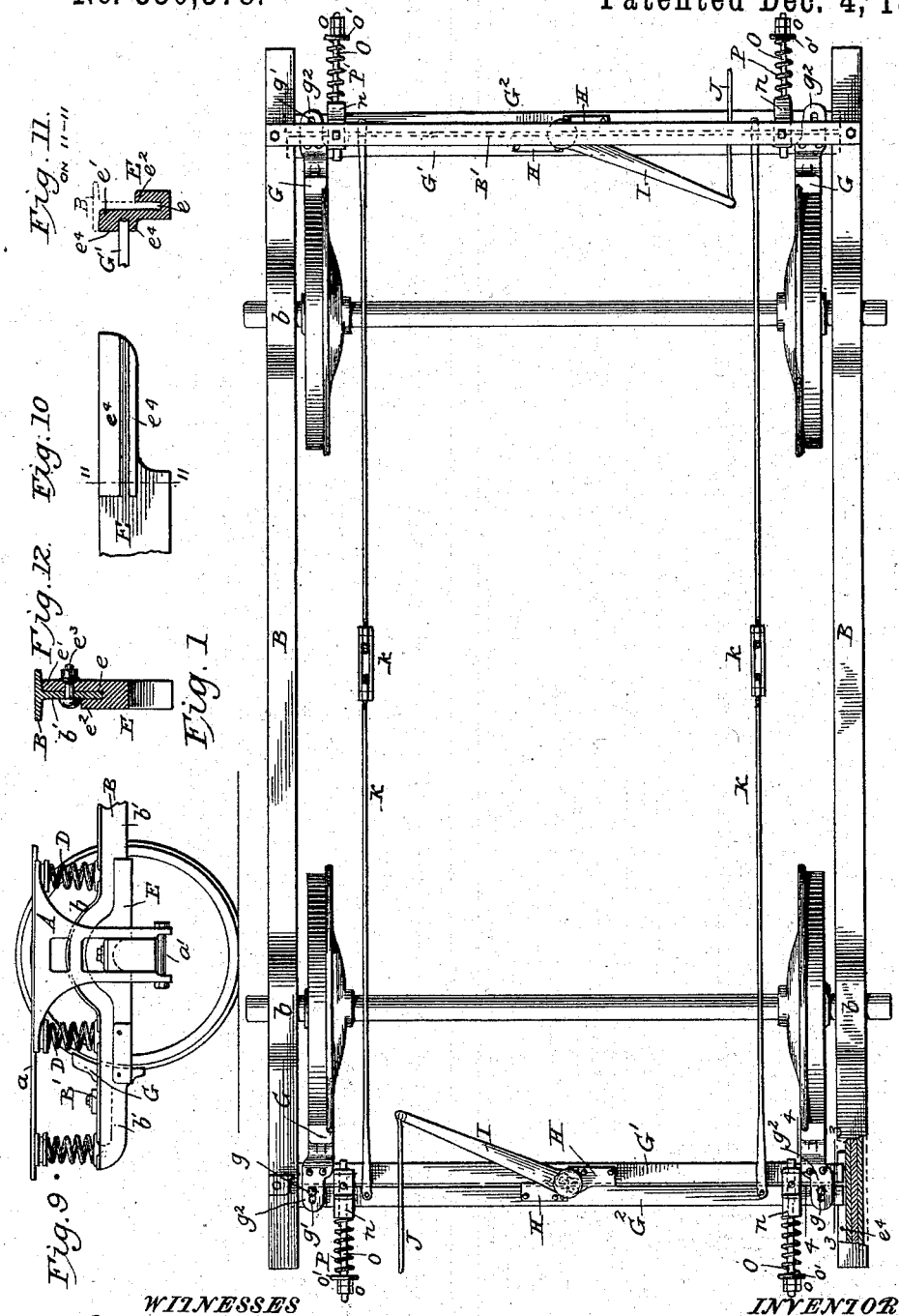

(No Model.) 3 Sheets—Sheet 1.

W. S. G. BAKER.
BRAKE FOR RAILWAY CARS.

No. 530,378. Patented Dec. 4, 1894.

WITNESSES
Milton O'Connell
B. Washington Miller

INVENTOR
William S. G. Baker
By his Attorneys
Baldwin Davidson & Wight (No Model.) 3 Sheets—Sheet 2.
W. S. G. BAKER.
BRAKE FOR RAILWAY CARS.
No. 530,378. Patented Dec. 4, 1894.
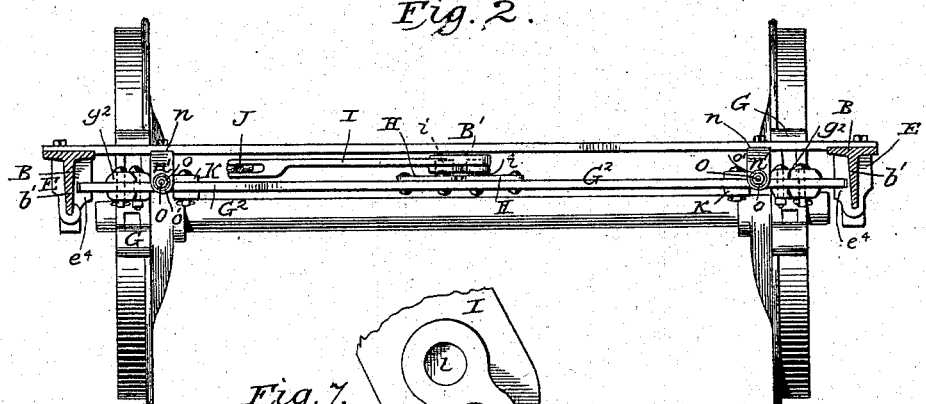
Fig. 2.
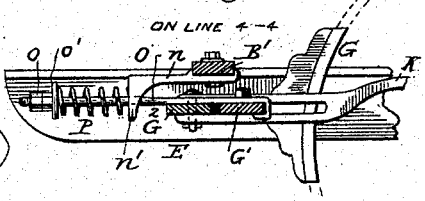
Fig. 7.
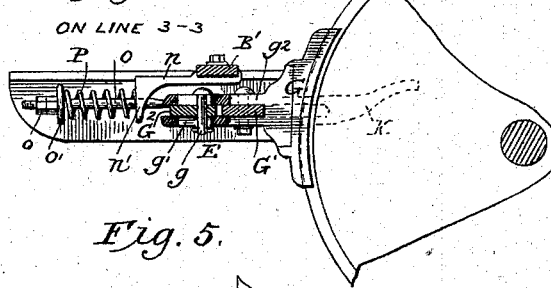
Fig. 3. ON LINE 3—3
Fig. 4. ON LINE 4—4
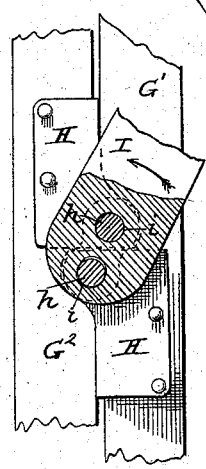
Fig. 5.
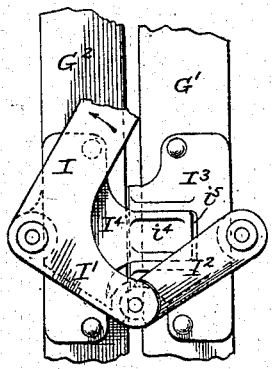
Fig. 8.
Fig. 6.
WITNESSES
Milton O'Connell
B. Washington Miller
INVENTOR
William S. G. Baker
By his Attorneys
Baldwin Davidson & Wight
THE NORRIS PETERS CO., PHOTO-LITHO., WASHINGTON, D. C.

(No Model.) 3 Sheets—Sheet 3.
W. S. G. BAKER.
BRAKE FOR RAILWAY CARS.
No. 530,378. Patented Dec. 4, 1894.
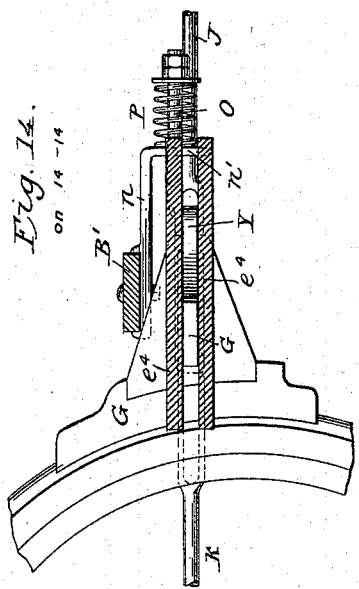
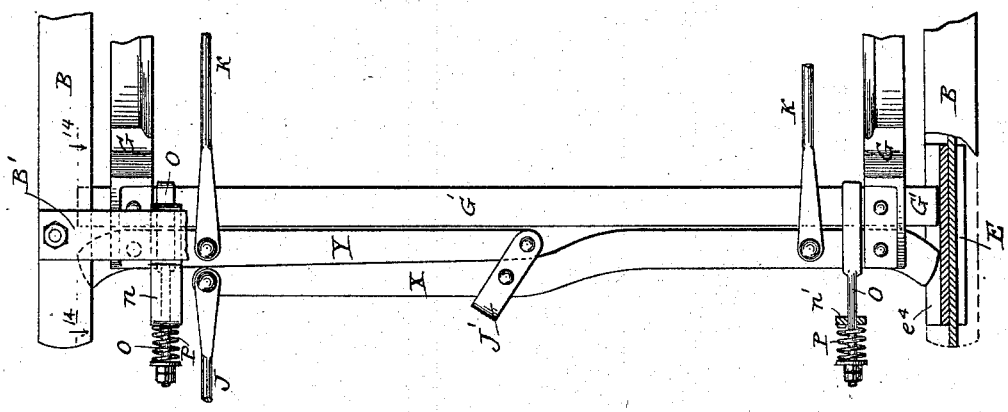

UNITED STATES PATENT OFFICE.

WILLIAM SEBASTIAN GROFF BAKER, OF BALTIMORE, MARYLAND.

BRAKE FOR RAILWAY-CARS.

SPECIFICATION forming part of Letters Patent No. 530,378, dated December 4, 1894.

Application filed April 14, 1893. Serial No. 470,338. (No model.)

*To all whom it may concern:*

Be it known that I, WILLIAM SEBASTIAN GROFF BAKER, a citizen of the United States, residing at Baltimore, in the State of Maryland, have invented certain new and useful Improvements in Car-Brakes, of which the following is a specification.

The object of my invention is to provide a simple, strong and efficient mechanism for applying the brake shoes to the wheels, and to so arrange the brake shoes and their operating mechanism relatively to the wheels and their axles, that the wheels and axles may be removed from the truck without detaching any parts of the brake mechanism or moving the shoes backwardly from the wheels.

In the accompanying drawings,—Figure 1 is a plan view of a car truck with my improved brake mechanism applied. Fig. 2 is an end elevation. Figs. 3 to 6 inclusive are on an enlarged scale. Fig. 3 is a section on the line 3—3 of Fig. 1. Fig. 4 is a section on the line 4—4 of Fig. 1. Fig. 5 is a detail view showing the manner of connecting the operating levers with the brake beams. Figs. 6 and 7 are further details of the same mechanism. Fig. 8 is a detail view of a modification. Fig. 9 is a detail view showing in side elevation the manner of supporting the side beams of the truck on the axle boxes. Figs. 10, 11 and 12 are detail views of the yokes or saddles interposed between the side beams and the axle boxes, Fig. 11 being a section on the line 11—11 of Fig. 10. Fig. 13 is a detail view of a modified form of brake mechanism. Fig. 14 is a section on the line 14—14 of Fig. 13.

The pedestals A, are provided with frame bars $a$, which should be secured to the car body. Below the axle boxes cross bolts $a'$ are secured to the pedestals, and these are readily removable to permit the wheels and axles and axle boxes to be conveniently removed without disturbing other parts of the truck.

On each side of the truck, I employ a side frame piece or side beam B, made in one piece and extending from one end of the truck to the other over the axle boxes. Near the ends, the two side beams are connected by cross pieces B'. The side beams B, are each made of a single piece of metal, preferably T-shaped, and rolled or formed to the proper shape. Where the beams cross the axles, they are formed with curved yokes $b$, in order that they may cross the axle boxes without being reduced in size and that the main portions of the beams on each side of the axle boxes may be below the level of the tops of the boxes in order to accommodate the springs. The yokes or curved portions may, however, be omitted, and the pedestals made longer, and the car body raised sufficiently, or the springs may be made shorter, but I prefer the construction shown.

The horizontal portion of the T-beams constitutes the top of the beam, and the springs D on opposite sides of the pedestals are arranged in seats in the horizontal or flat portion of the beam. As the vertical portion $b'$, of the beam is narrow, instead of mounting it directly on the axle boxes, I provide yokes or saddles E, which are interposed between the boxes and the T-beams. The yokes are suitably formed to embrace the upper portions of the axle boxes, and are provided with recesses and flanges $e$ $e'$ $e^2$, to fit the T-beams, the vertical portions of which are secured to the flanges $e'$ by bolts $e^3$. The yokes are provided with curved seats on their upper sides, corresponding with the curved under sides of the yokes or curved portions $b$, of the side beams, in order that the side beams may rock transversely across the axle boxes to a slight extent, to relieve the strain which might sometimes otherwise occur.

The brake shoes G are shown as mounted outside the wheels. They have suitable frames and each pair is secured to a cross beam G'. The brake shoes are curved, as usual, and their centers are above the axles, so that when the bolts $a'$ are detached, the wheels and axles may be removed without the necessity of drawing back the brake shoes.

It will be observed, by reference to Fig. 9, that the wheels will clear the shoes when they are moved downwardly relatively thereto. Parallel, with each brake beam G', there is another beam G², which is connected with the frames of the brake shoes by means of bolts $g$, passing through slots $g'$ in the castings $g^2$. Each beam G' G², is provided with a casting H, having a stud $h$ arranged diagonally opposite each other. These studs enter sockets $i$ in an operating lever I. When this lever is turned, it effects the separation of the beams G' and G², and causes the brake shoes to be applied to the wheels in the manner hereinafter more clearly explained. The mechanisms on opposite ends of the truck are substantially the same.

Each of the levers I, is provided with a rod J, which may be connected to any suitable operating mechanism. The two beams G² are connected by rods K, having adjusting or tightening devices $k$. It will, therefore, be seen that when either of the levers I, is operated, the beams G' will be moved toward the wheels, and will therefore carry the brake shoes into engagement with the wheels.

Arms $n$ are secured to the cross beams B', and are provided with downwardly projecting lugs or flanges $n'$, through which extend bars O, connected with the brake beams G'. The outer ends of the bars are provided with adjusting nuts $o$, and with washers $o'$, between which and the flanges are interposed springs P. These springs tend to withdraw the shoes and the beams from the wheels. The nuts $o$ are adjustable in order that the tension of the springs may be varied to accommodate wear on the wheels and the brake shoes.

As shown particularly in Figs. 10 and 11, each of the yokes or saddles E, is provided with flanges $e^4$, between which the ends of the beams G' G², extend. These flanges constitute guides to keep the beams in proper working position. By this means, twisting, vertical movement or distortion of the beams is avoided.

It will be observed that the connecting rods K, and in fact all the brake mechanism, is located above the axles so that the wheels and axles may be readily removed without disturbing any parts of the truck frame or the brake mechanism.

In Fig. 8, a slight modification is shown. An operating lever I, is pivoted on a casting secured to one of the brake beams G², and it has an arm I', projecting at right angles and secured to a link I² pivoted on a casting I³ secured to the brake beam G'. The casting I⁴ on the brake beam G², has a tongue $i^4$, entering a recess $i^5$, on the casting I³. By this means, the brake beams are permitted to move toward and from each other, and are held against transverse movement relatively thereto.

In Figs. 13 and 14, I have shown a modification, or a different form of brake mechanism. The brake beam G' is mounted in substantially the same way as the corresponding brake beam in Fig. 1, and extends into and is guided in or between flanges $e^4$. Instead of employing a brake beam such as shown in Fig. 1, at G², I employ two levers X and Y. The lever X, to which the operating rod J, is secured, is connected with the brake shoe frame or casting on one side, and is also connected by a link or loop J' to the lever Y, connected with the brake shoe or casting on the opposite side. The arrangement at the opposite end of the truck is substantially the same.

Rods K, are employed to connect the levers X and Y, with corresponding levers on the opposite end of the truck. The ends of the levers X and Y, extend between the flanges $e^4$, by which means they are kept in proper working position. The ends of the levers X and Y are slightly curved, in order that they may move freely in the guides about their pivots or fulcrums. By the arrangement shown, a large bearing surface is afforded, and twisting or distortion of the levers and beams is avoided.

I claim as my invention—

1. The combination, substantially as hereinbefore set forth, with the wheels, axles and axle boxes, of a truck frame supported on the axle boxes, brake beams above the plane of the axles arranged to slide in guides in the truck frame, rods extending over the axles and connecting the brake beams, being also arranged horizontally in the same plane with the brake beams and mechanism for operating the brake beams.

2. The combination, substantially as hereinbefore set forth, with the wheels, axles and axle boxes, of a truck frame mounted on the axle boxes, brake beams arranged above the plane of the axles and mounted in horizontal guides to slide in a horizontal plane toward and from the wheels, supplemental beams at each end of the truck parallel with the brake beams, connecting rods extending over the axles and connecting the supplemental beams at each end of the truck, and lever mechanism operating upon the brake beams and supplemental beams to apply the brakes, substantially as set forth.

3. The combination, substantially as hereinbefore set forth, with the wheels, axles and axle boxes, of a truck frame mounted on the axle boxes, brake beams at each end of the truck arranged above the plane of the axles, and having their ends arranged in guides in the truck frame, brake shoes secured to the brake beams and having their centers above the axles, supplemental beams parallel with and in the same horizontal plane with the brake beams, connecting rods extending over the axles for uniting the supplemental beams and lever mechanism operating upon the beams in a horizontal direction to apply the brakes.

4. The combination, substantially as hereinbefore set forth, with the wheels, axles and axle boxes, of side beams suitably connected together and extending over the axle boxes, saddles interposed between the axle boxes and the side beams, brake beams at each end of the truck arranged to slide horizontally in guides in the saddles toward and from the wheels, and mechanism for operating the brake beams.

5. The combination, substantially as hereinbefore set forth, with the wheels, axles and axle boxes, of brake shoes moving horizontally toward and from the wheels and having curved faces adjacent to the wheels with their centers arranged above the axles, brake beams connecting the shoes, guides for the ends of the brake beams, supplemental beams at each end of the truck parallel with and in the same horizontal plane with the brake beams, rods extending over the axles connecting the supplemental beams and removable bolts or devices arranged transversely below the axle boxes to connect them to the pedestals or truck frame, the organization being such that by removing said bolts or devices, the wheels, axles and axle boxes may be withdrawn from the truck without uncoupling or disconnecting the connecting rods and without removing the brake beams and brake shoes from their normal position.

6. The combination, substantially as hereinbefore set forth, with the wheels, axles and axle boxes, of a truck frame mounted on the axle boxes, a brake beam at each end of the truck arranged to slide in guides in the truck frame, a supplemental beam at each end of the truck arranged in the same plane with the brake beams and also having its ends arranged to slide in guides in the truck frame, connecting rods for the supplemental beams, and lever mechanism operating upon the beams to apply the brakes.

7. The combination, substantially as hereinbefore set forth with the wheels, axles and axle boxes, of a brake beam at each end of the truck, a supplemental beam parallel with and adjacent thereto, the castings on the beams, studs on the castings arranged diagonally opposite each other and an operating lever having sockets into which the stud projects.

8. The combination, substantially as hereinbefore set forth, with the wheels, axles and axle boxes, of the brake shoes, a brake beam by which the brake shoes are carried, another beam or lever arranged adjacent to the brake beam and guides in the side beams of the truck into which the ends of the brake beam and the lever project and by which they are guided to prevent their twisting.

9. The combination, substantially as hereinbefore set forth, with the wheels, axles and axle boxes, of the brake shoes, a brake beam by which the brake shoes are carried, operating levers acting upon the brake beam, the truck frame, and guides in the truck frame into which the ends of the brake beam and levers extend.

10. The combination, substantially as hereinbefore set forth, with a pair of wheels, of a pair of brake shoes, a brake beam connecting them, a pair of levers pivotally connected with the brake shoes and having curved ends and guides in the truck frame into which the ends of the brake beam and the curved ends of the levers extend.

In testimony whereof I have hereunto subscribed my name.

WILLIAM SEBASTIAN GROFF BAKER.

Witnesses:
   J. PAUL BAKER,
   DANIEL W. POWELL.